M. J. HART.
SHOE NAILING MACHINE.
APPLICATION FILED MAR. 24, 1916.

1,218,649.

Patented Mar. 13, 1917.
2 SHEETS—SHEET 1.

Witnesses
N. Abramson

Inventor
Max J. Hart
By H. B. Willson &co
Attorneys

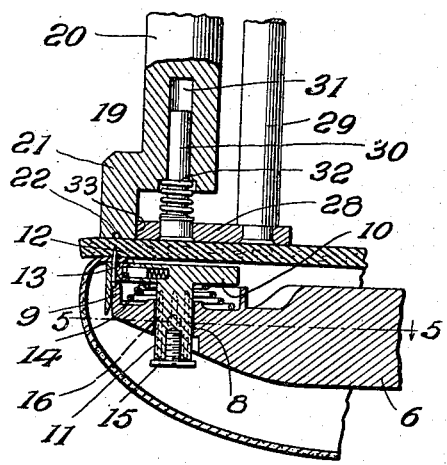

UNITED STATES PATENT OFFICE.

MAX J. HART, OF CENTRALIA, ILLINOIS.

SHOE-NAILING MACHINE.

1,218,649.        Specification of Letters Patent.        Patented Mar. 13, 1917.

Application filed March 24, 1916.   Serial No. 86,462.

*To all whom it may concern:*

Be it known that I, MAX J. HART, a citizen of the United States, residing at Centralia, in the county of Marion and State of Illinois, have invented certain new and useful Improvements in Shoe-Nailing Machines; and I do declare the following to be a full, clear, and exact description of the invention, such as will enable others skilled in the art to which it appertains to make and use the same.

My invention is a machine designed for repairing turned shoes to the extent of nailing the sole to the upper at any point where these parts have become separated.

As is well known, it is impossible to nail the sole to the edge of the upper by driving the nails inwardly through said sole, this being due to the fact that said edge is not turned in a sufficient amount to allow the clenched ends of the nails to effectively hold therein. It is therefore the object of the present invention to provide a simply constructed yet efficient machine for driving the nails first through the edge of the upper and then through the sole, the nails preferably having elongated heads which will not easily pull through the edge of the upper.

With this general object in view, the invention resides in certain novel features of construction and in unique combinations of parts to be hereinafter fully described and claimed, the descriptive matter being supplemented by the accompanying drawings which constitute a part of this application and in which:

Fig. 3 is a detail vertical section through the nail driving and clenching mechanisms showing a nail partially projected through the edge of a shoe upper and the shoe sole;

Fig. 4 is a similar view at the completion of the driving and clenching operation;

Fig. 5 is a detail horizontal section taken on the plane of the line 5—5 of Fig. 3;

Fig. 6 is an additional detail horizontal section taken on the plane of the line 6—6 of Fig. 1;

Fig. 7 is a detail perspective view of the anvil and presser foot;

Fig. 8 is a perspective view of the nail holder; and

Fig. 9 is a similar view of a portion of the arm which extends into the shoe and the nail rests carried by said arm.

Figure 1:
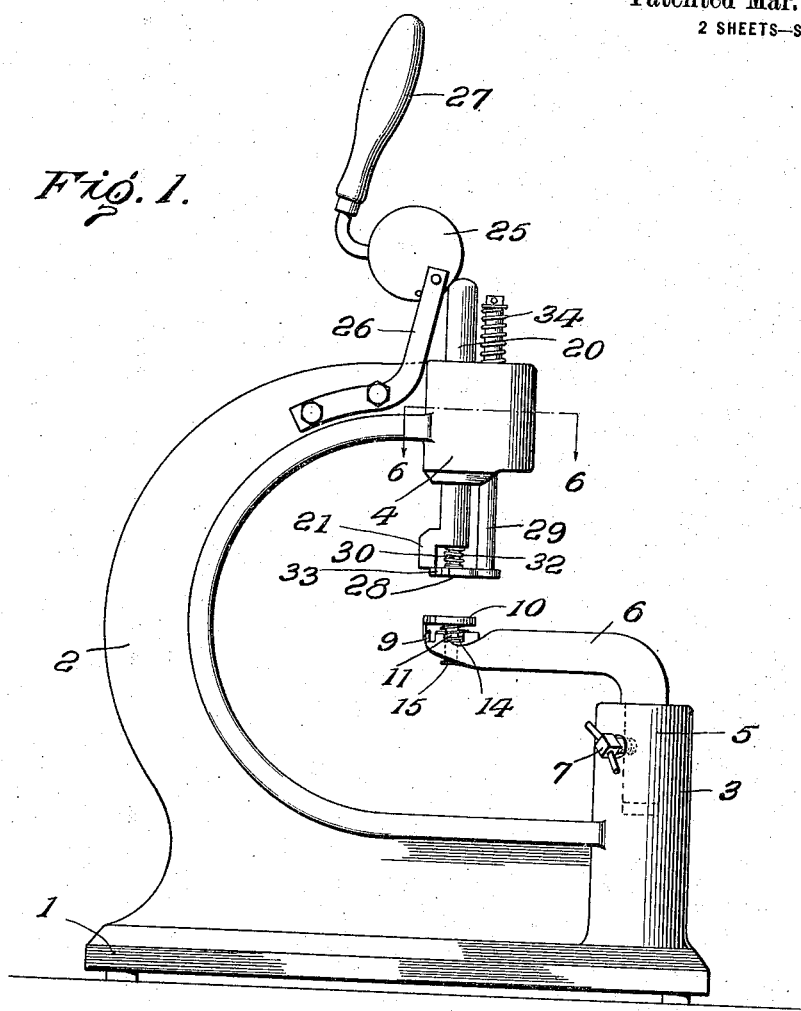
Figure 1 is a side elevation of the improved machine at rest.
Figure 2:
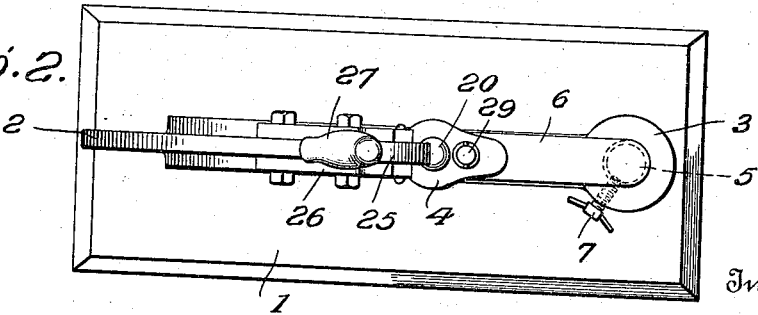
Fig. 2 is a top plan view thereof.

In specifically describing the construction shown in the drawings above briefly described, similar characters will be placed on corresponding parts throughout the several views and reference will be herein made to the numerous elements by their respective indices. To this end, the numeral 1 represents an appropriate base from one end of which a C-shaped arm 2 rises, while at the other end of said base an upright post 3 is provided, the free end of the arm 2 having a guide 4 offset laterally in respect to the post 3 and spaced a considerable distance above said post. All of these parts are preferably though not necessarily cast as a single unit as shown.

The upper end of the post 3 is provided with a socket receiving therein an upright stub shaft 5 carried by one end of a horizontal arm 6, said shaft being normally held against rotation by a clamping screw 7. The free end of the arm 6 is formed with an upright circular opening 8 and is provided with a series of upstanding nail rests 9 which are disposed on an arc described around the center of the aforesaid opening, three of these rests being shown in the present embodiment of the invention, but it will be understood that any number could well be used.

A nail holder 10 is carried by the arm 6 for holding a nail on any one of the rests 9, said holder being shown in the present form of the invention as comprising a substantially circular plate having a depending stub shaft 11 received rotatably in the opening 8, this plate having formed vertically therethrough an opening 12 which may be disposed over any one of the rests 9, a spring pressed jaw 13 being located in said opening for gripping the nail and holding it on the rest as shown clearly in Fig. 3. A coiled spring 14 surrounds the stub shaft 11 and is interposed between the holder 10 and the arm 6, said spring thus serving to normally raise said holder above the upper ends of the rests 9, upward movement of said holder being limited however, by an appropriate stop 15 on the lower end thereof.

The stub shaft 11 is formed with a series of vertically extending grooves 16 coöperating with a spring pressed ball or the like 17 carried within a horizontal bore 18 formed in the arm 6, said grooves being so disposed as to allow them to coact with the ball 17 in such a manner as to yieldably retain the holder 10 in any of its adjusted positions, in which positions the opening 12 will be disposed directly above one of the nail rests 9.

Spaced above the nail holder 10 is an anvil 19 which is adapted to force the shoe sole toward the nail held by the holder 10, in order that said nail may be thus driven and clenched. The anvil 19 comprises an upright shaft 20 slidable through a vertical bore in the guide 4, and a laterally extending lug 21 having in its lower end a groove 22 to receive and clench the point of the nail. The shaft 20 is alined axially with the stub shaft 11 of the holder 10 and is formed with grooves 23 coöperating with a spring pressed ball 24 carried by the guide 4, the location of said grooves being such as to allow the ball 24 to yieldably hold the shaft 20 against rotation after it has been properly turned to dispose the lug 21 immediately above the opening 12 of the holder 10. With the parts in these positions, the anvil 19 is depressed by any suitable means, it being normally raised by means yet to be described. The result of this depression is that the shoe sole is forced against the holder 10 which now moves downwardly upon the nail held thereby, this nail being now allowed no downward movement. Thus, said nail will be forced through the sole of the shoe into the groove 22 of the lug 21, this groove now clenching said nail.

Although as above suggested, any preferred means may be provided for depressing the shaft 20, a cam 25 preferably coöperates with the upper end of said shaft, said cam being mounted on one or more brackets 26 rising from the arm 2. For turning the cam 25, a handle 27 is provided, it being understood that the entire machine is hand operated.

Preferably used in connection with the parts above described is a presser foot 28 in the form of a suitably shaped metal plate carried by and extending laterally from the lower end of an upright shaft 29, the upper end of the shaft being slidable vertically in a bore formed through the guide 4. A stud 30 rises from the foot 28 and is slidably received in a socket 31 formed in the lower end of the shaft 20, a comparatively stiff coiled spring 32 being positioned around said stud and interposed between said shaft 20 and the foot 28 to hold these parts normally spaced a sufficient distance to position the lug 21 above the foot. The latter is formed with a series of openings 33 which are alined vertically at all times with the nail rests 9, said openings receiving the lug 21 when the anvil is depressed. A coil spring 34 of less strength than the spring 32 bears against a collar or the like on the upper end of the shaft 29 and serves to normally raise said shaft, the foot 28, and the entire anvil 19.

By constructing and arranging the numerous parts of the machine as shown and described, the nail to be driven may be positioned on any one of the rests 9 to properly locate said nail for most effectively securing the loosened parts of the shoe together, said nail having been inserted in the opening 12 by hand, in which opening it is now firmly gripped by the spring pressed jaw 13. The anvil 19 is now rotated until its lug 21 is alined vertically with the opening 12, the machine being now in position to receive the shoe which latter is applied as shown in Figs. 3 and 4. The next operation is to depress the handle 27. This, due to the fact that the spring 32 is of greater strength than the spring 34, causes the anvil 19 and presser foot 28 to move downwardly as a unit until said foot comes in contact with the sole of the shoe. When this occurs, downward movement of the foot 28 will be limited, but the anvil 19 will continue to move downwardly, the result being that the lug 21 will pass through one of the openings 33 into contact with the shoe sole. Further downward movement of the handle 27, will now cause the anvil to depress the entire shoe sole, this being allowed by the fact that the holder 10 may move downwardly against the tension of its spring 14. As this takes place, since the nail cannot move downwardly due to its support on one of the rests 9, said nail will be forced through the turned edge of the upper and the sole into the groove 22, the latter now serving to clench said nail on the outer side of the sole.

The above described machine has been found to operate to great advantage for the purpose for which it is designed, namely, for repairing turned shoes, and it will be evident that on account of the extreme simplicity of the device, it may be manufactured and marketed at a comparatively small cost.

In the foregoing I have described certain specific details of construction for accomplishing probably the best results, and in the accompanying drawings, I have shown such details, but obviously numerous changes may be made within the scope of the invention as claimed without sacrificing the main advantages thereof.

I claim:

1. A machine for repairing turned shoes comprising an arm to extend into the shoe, a nail holder mounted rotatably on said arm and yieldable toward the same, a series of nail rests carried by said arm and disposed on the arc of movement of the holder, the latter being adapted to hold a nail on any of said rests with its point directed toward the sole of the shoe, and an anvil for forcing said sole against the nail to drive and clench the latter.

2. A machine for repairing turned shoes comprising an arm for reception in the shoe, said arm having a transverse opening and having concentric to said opening a number of nail rests, a nail holder having a stub shaft received in said opening whereby said holder may be rotated to position it in operative relation with any of the nail rests to hold a nail thereon with its point directed toward the shoe sole, a spring for yieldably retaining said holder in spaced relation to the arm, and an anvil to force the shoe sole against the nail to drive and clench the latter.

3. A machine for repairing turned shoes comprising an arm to extend into the shoe, said arm having a nail rest, a nail holder mounted on said arm and having an opening to receive a nail on said rest, said holder being yieldable toward the arm, a spring pressed jaw in the aforesaid opening for holding the nail with its point directed toward the sole of the shoe, and an anvil for forcing said sole against the nail to drive and clench the latter.

4. A machine for repairing turned shoes comprising an arm to extend into the shoe, a nail holder mounted rotatably on said arm and yieldable toward the same, said holder having an opening to receive a nail, a spring pressed jaw in said opening for holding the nail therein with its point directed toward the shoe sole, an arcuate series of nail rests on the arm opposite any one of which the aforesaid opening may be disposed by rotating the holder, and an anvil for forcing the sole against the nail and holder to drive and clench the former.

5. A machine for repairing turned shoes comprising means for rigidly holding a nail in the interior of a shoe with its point directed toward the sole of said shoe, an anvil for forcing the shoe sole toward the nail to drive and clench the latter, and a presser foot for bearing yieldably against the exterior of the sole during the driving and clenching operation.

6. A machine for repairing turned shoes comprising means for rigidly holding a nail in the interior of a shoe with its point directed toward the sole of said shoe, an anvil for forcing the shoe sole toward the nail to drive and clench the latter, a presser foot for bearing yieldably against the exterior of the shoe during this operation, and means for moving said presser foot and anvil successively against the sole.

7. A machine for repairing turned shoes comprising means for rigidly holding a nail in the interior of a shoe with its point directed toward the sole of said shoe, said means including a yieldable member to engage the inner side of the sole, a presser foot to engage the outer side of said sole and force it against said yielding member, an anvil to force said sole toward the nail to drive and clench the latter, and means for moving said presser foot and anvil successively into engagement with the sole.

8. A machine for repairing turned shoes comprising means for rigidly holding a nail in the interior of a shoe with its point directed toward the sole of said shoe, said means including a yieldable member to engage the inner side of said sole, a presser foot to engage the outer side of the sole and force it against said yieldable member, an anvil to force said sole toward the nail to drive and clench the latter, means for operating said anvil, and a yielding operating connection between said anvil and the presser foot for forcing the latter into engagement with the sole before said anvil engages the same.

9. A machine for repairing turned shoes comprising means for holding a nail in the interior of a shoe with its point directed toward the sole of said shoe, an anvil for forcing said sole toward the nail to drive and clench the latter, a presser foot for bearing against the outer side of the sole during this operation, said foot having an opening through which the anvil may move, a yielding operating connection between said anvil and presser foot for moving the latter into engagement with the sole before the anvil engages the same, and means for operating said anvil.

10. A machine for repairing turned shoes comprising means for holding a nail in the interior of a shoe with its point directed toward the sole of said shoe, said means being rotatable to position the nail at any one of a number of points, an anvil for forcing the shoe sole toward the nail to drive and clench the latter, said anvil being rotatable on an axis alining with the axis of said nail holding means, a presser foot for engagement with the outer side of the sole during the driving and clenching operation, and means for forcing said foot and anvil successively into engagement with the shoe sole, said foot having an arcuate series of openings through any one of which the anvil may pass.

11. A machine for repairing turned shoes, comprising means for holding a nail in the interior of a shoe with its point directed toward the sole of said shoe, said means being movable to allow the nail to be positioned at any one of a number of points, an anvil adapted to force the shoe sole against the nail to drive and clench the latter, a presser foot for engaging the outer side of the sole, said foot having a number of openings through any one of which the anvil may pass, and means for bringing said foot and anvil successively into engagement with the sole.

12. A machine for repairing turned shoes comprising means for holding a nail rigidly in the interior of a shoe with its point directed toward the sole of said shoe, a guide spaced from said means, a pair of shafts slidable through said guide, a presser foot carried by one of said shafts for movement against the outer side of the shoe sole, an anvil member carried by the other shaft for forcing the sole against the nail to drive and clench the latter, means for shifting the last named shaft axially in one direction, a spring for shifting the other shaft axially in the other direction, and a yielding operating connection between the two shafts, said connection being greater in power than the aforesaid spring.

13. A machine for repairing turned shoes comprising means for holding a nail in the interior of a shoe with its point directed toward the sole of said shoe, said means being rotatable on a given axis to allow the nail to be disposed at any one of a number of points, a guide spaced from the aforesaid means, a shaft mounted for axial shifting and for rotation in said guide, said shaft being alined with the axis of the aforesaid means and having a laterally extending lug on one end, a presser foot in the form of a plate adapted to engage the outer side of the shoe sole, said plate having an arcuate series of notches through any one of which the aforesaid lug may project to engage the shoe sole, a yielding connection between said presser foot and shaft, a second shaft parallel with the first named shaft and carrying said presser foot, a spring for normally shifting said second shaft in one direction, said spring being of less strength than the aforesaid yielding connection, and means for forcing the first named shaft in the opposite direction.

In testimony whereof I have hereunto set my hand in presence of two subscribing witnesses.

MAX J. HART.

Witnesses:
JOHN W. CLARKE,
EDWARD J. DOBRY.

Copies of this patent may be obtained for five cents each, by addressing the "Commissioner of Patents, Washington, D. C."